(12) United States Patent
Shum et al.

(10) Patent No.: US 6,738,533 B1
(45) Date of Patent: May 18, 2004

(54) MINIMUM SAMPLING RATE AND MINIMUM SAMPLING CURVE FOR IMAGE-BASED RENDERING

(75) Inventors: Heung-Yeung Shum, Beijing (CN); Jin-Xiang Chai, Redmond, WA (US); Xin Tong, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/538,067

(22) Filed: Mar. 29, 2000

(51) Int. Cl.[7] .................................................. G06K 9/32
(52) U.S. Cl. ........................ 382/299; 382/312; 707/101
(58) Field of Search ................................ 382/299, 312, 382/276, 277, 285, 255, 154, 269, 232, 254, 316; 348/729, 723, 627, 222.1, 207.99; 707/100, 101; 345/427, 419, 426, 421; 600/508; 359/9

(56) References Cited

U.S. PATENT DOCUMENTS 5,313,568 A * 5/1994 Wallace et al. ............. 345/426

(List continued on next page.)

OTHER PUBLICATIONS

E.H. Adelson and J. Bergen. The plenoptic function and the elements of early vision. In Computational Models of Visual Processing. Pp. 3–20. MIT Press, Cambridge, MA, 1991.
S.J. Gortler, R. Grzeszcuk, R. Szeliski, M.F. Cohen. The lumigraph. In Computer Graphics Proceedings, Annual Conference Series, pp. 43–54, Proc. SIGGRAPH'96 (New Orleans), Aug. 1996, ACM SIGGRAPH.

M. Levoy and P. Hanrahan. Light field rendering. In Computer Graphics Proceedings, Annual Conference Sseries, pp. 31–42, Proc. SIGGRAPH'96 (New Orleans), Aug. 1996, ACM SIGGRAPH.

(List continued on next page.)

Primary Examiner—Jayanti K. Patel
Assistant Examiner—Seyed Azarian
(74) Attorney, Agent, or Firm—Lyon & Harr, LLP; Mark A. Watson

(57) ABSTRACT

A minimum sampling rate and a minimum sampling curve for continuous representation of a scene are disclosed. The minimum sampling rate for light-field rendering is determined in accordance with $$\Delta t_{max} = \frac{1}{2K_{\Omega_v} f h_d},$$

where $K_{\Omega_v}$ accounts for a light-field signal cut-off frequency, a sampling camera resolution and an output resolution, $f$ specifies a sampling camera focal length, and $h_d$ specifies a light-field depth range. The minimum sampling curve for image-based rendering is determined as constrained by $N_d=2K_{\Omega_v} f h_d \Delta t$, $N_d \geq 1$, where $N_d$ is the number of depth layers, $\Delta t$ specifies a sampling interval along a t direction. Where IBR is be performed under uncertain depth, the curve is determined as $$\Delta t_{max} = \min_{z_e} \frac{(z_e + \Delta\eta)(z_e - \Delta\eta)}{4 f K_{\Omega_v} \Delta\eta},$$

where $\Delta t_{max}$ specifies a maximum sampling interval along a t direction, $z_e$ specifies an estimated depth, and $\Delta\eta$ specifies a depth error.

45 Claims, 8 Drawing Sheets

U.S. PATENT DOCUMENTS

| | | | | |
|---|---|---|---|---|
| 5,365,428 A | * | 11/1994 | dePinto et al. | 600/508 |
| 5,751,926 A | * | 5/1998 | Kasson et al. | 345/419 |
| 6,166,742 A | * | 12/2000 | He | 345/421 |
| 6,466,207 B1 | * | 10/2002 | Gortler et al. | 345/427 |
| 6,502,097 B1 | * | 12/2002 | Chan et al. | 707/100 |
| 6,549,308 B1 | * | 4/2003 | Camahort | 359/9 |

OTHER PUBLICATIONS

B. Girod, Motion compression, visual aspects, accuracy, and fundamental limits. In Motion Analysis and Image Sequence Processing, Kluwer 1995, chapter 5.

* cited by examiner

MINIMUM SAMPLING RATE AND MINIMUM SAMPLING CURVE FOR IMAGE-BASED RENDERING

FIELD OF THE INVENTION

This invention relates generally to image-based rendering (IBR), and more particularly to determining a minimum sampling rate and/or a minimum sampling curve for IBR.

BACKGROUND OF THE INVENTION

Image-based rendering (IBR) in general simulates a continuous range of virtual camera viewpoints of a scene from a discrete set of input images of the scene. IBR can be used for a variety of different applications. For example, a currently popular application is to use IBR in conjunction with electronic commerce-type applications on the Internet. A user interested in seeing a car's interior or exterior from different viewpoints, for example, may be able to rotate inside a virtual camera inside the car's interior, and zoom in and out to see more or less of the interior, and may also be able to rotate a virtual camera around the car's exterior. Thus, using IBR in such instances enables consumers to better see physical real-world objects that they may desire to purchase, allowing those consumers to make better-informed decisions.

IBR can be classified as a continuum between two different approaches. At one end, traditional texture mapping relies on accurate geometrical models, but only a few images. For example, in an IBR system with depth maps, such as three-dimensional (3D) warping, view interpolation, view morphing, and layered-depth images, a model has a set of images of a scene and their associated depth maps. When depth is available for every point in an image, a new image can be rendered from any nearby point of view by projecting the pixels of the image to their appropriate 3D locations, and reprojecting them onto a new image.

At the other end of the continuum, light-field rendering uses many images, but does not require any geometrical information. For example, light-field rendering generates a new image of a scene by appropriately filtering and interpolating an already acquired set of sample images. An approach known as Lumigraph is equivalent to light-field rendering, but applies approximated geometry to compensate for non-uniform sampling to improve rendering quality. Light-field rendering, however, has a tendency to rely on oversampling to counter undesirable aliasing effects in the rendered new image. Oversampling results in intensive data acquisition, significant storage space required to store the acquired images, and a large degree of redundancy in the acquired images.

Little is known in the prior art as to the relationship between IBR techniques at the texture-mapping end of the continuum and IBR techniques at the light-field rendering end of the continuum. In particular, when a given depth is specified, the number of sampled images necessary to achieve optimal new image rendering is unknown. For light-field rendering such as Lumigraph, the number of sampled images necessary to achieve optimal new image rendering is also unknown, which results in prior art approaches oversampling the scene, as described in the previous paragraph. For these and other reasons, therefore, there is a need for the present invention.

SUMMARY OF THE INVENTION

The invention relates to determining a minimum sampling rate for light-field rendering specifically, and to determining a minimum sampling curve for image-based rendering (IBR) in general. In one embodiment, the minimum sampling rate for light-field rendering is determined in accordance with $$\Delta t_{max} = \frac{1}{2K_{\Omega_v} f h_d},$$

where $K_{\Omega_v}$ accounts for a light-field signal cut-off frequency, a sampling camera resolution and an output resolution, $f$ specifies a sampling camera focal length, and $h_d$ specifies a light-field depth range. In another embodiment, the minimum sampling curve for IBR is determined as constrained by $N_d = 2K_{\Omega_v} f h_d \Delta t$, $N_d \geq 1$, where $N_d$ is the number of depth layers, $\Delta t$ specifies a sampling interval along a t direction, $K_{\Omega_v}$ accounts for a signal cut-off frequency, a sampling camera resolution and an output resolution, $f$ specifies a sampling camera focal length, and $h_d$ specifies a depth range. Where IBR is to be performed under uncertain depth conditions, the minimum sampling curve is determined in one embodiment as $$\Delta t_{max} = \min_{z_e} \frac{(z_e + \Delta \eta)(z_e - \Delta \eta)}{4 f K_{\Omega_v} \Delta \eta},$$

where $\Delta t_{max}$ specifies a maximum sampling interval along a t direction, $K_{\Omega_v}$ accounts for a signal cut-off frequency, a sampling camera resolution and an output resolution, $f$ specifies a sampling camera focal length, $z_e$ specifies an estimated depth, and $\Delta \eta$ specifies a depth error.

Embodiments of the invention provide for advantages over the prior art. In particular, embodiments provide for the number of image samples from a four-dimension (4D) light field and the geometrical and textural information needed to generate a continuous representation of a scene for which new images are to be generated. This is also referred to as plenoptic sampling, that is, the number of images needed for plenoptic modeling. Furthermore, the minimum sampling curve described in some embodiments of the invention serves as a guiding design principle for IBR systems, and bridges the gap between IBR and geometry-based rendering.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
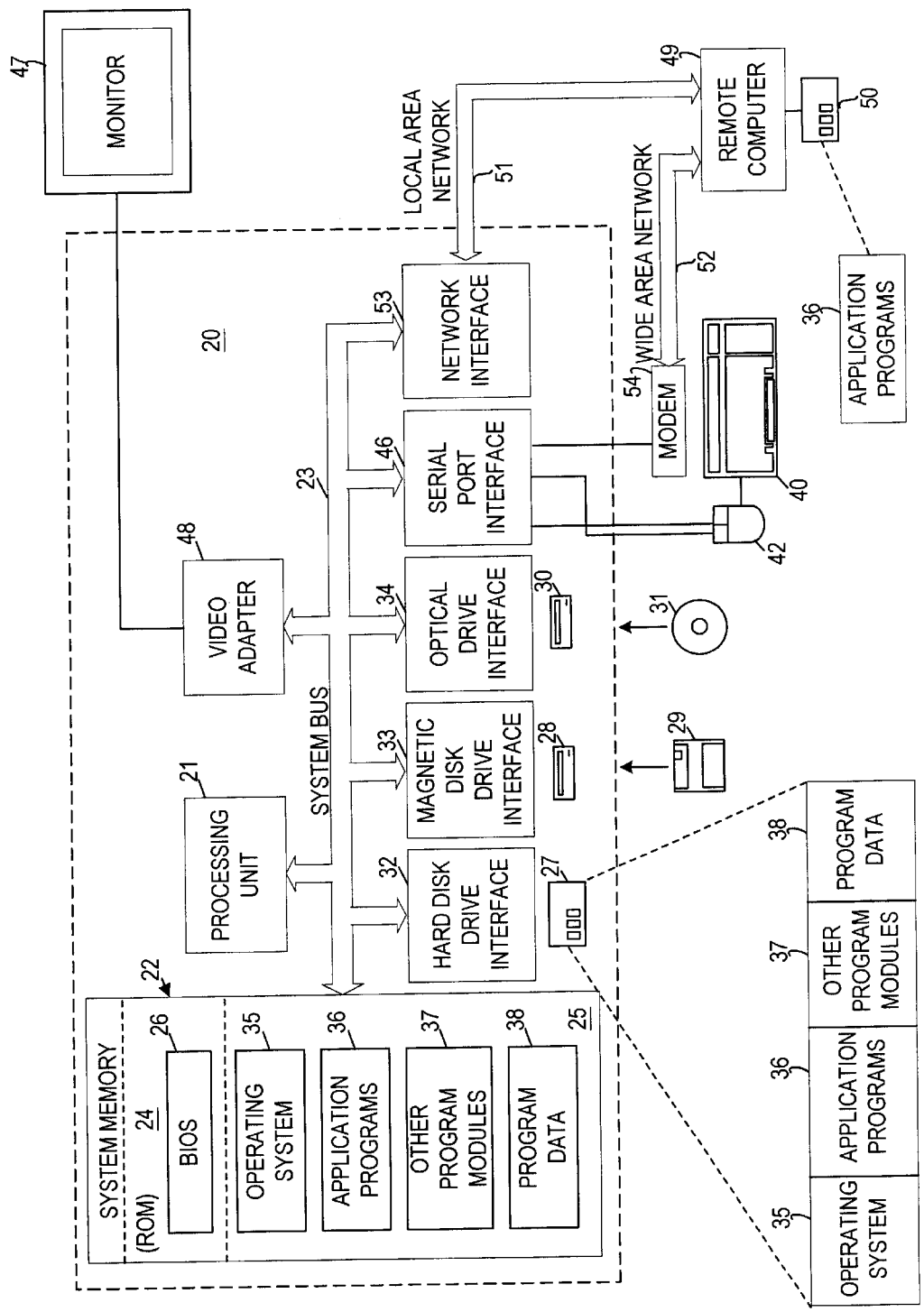
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Image-Based Rendering

Figure 2:
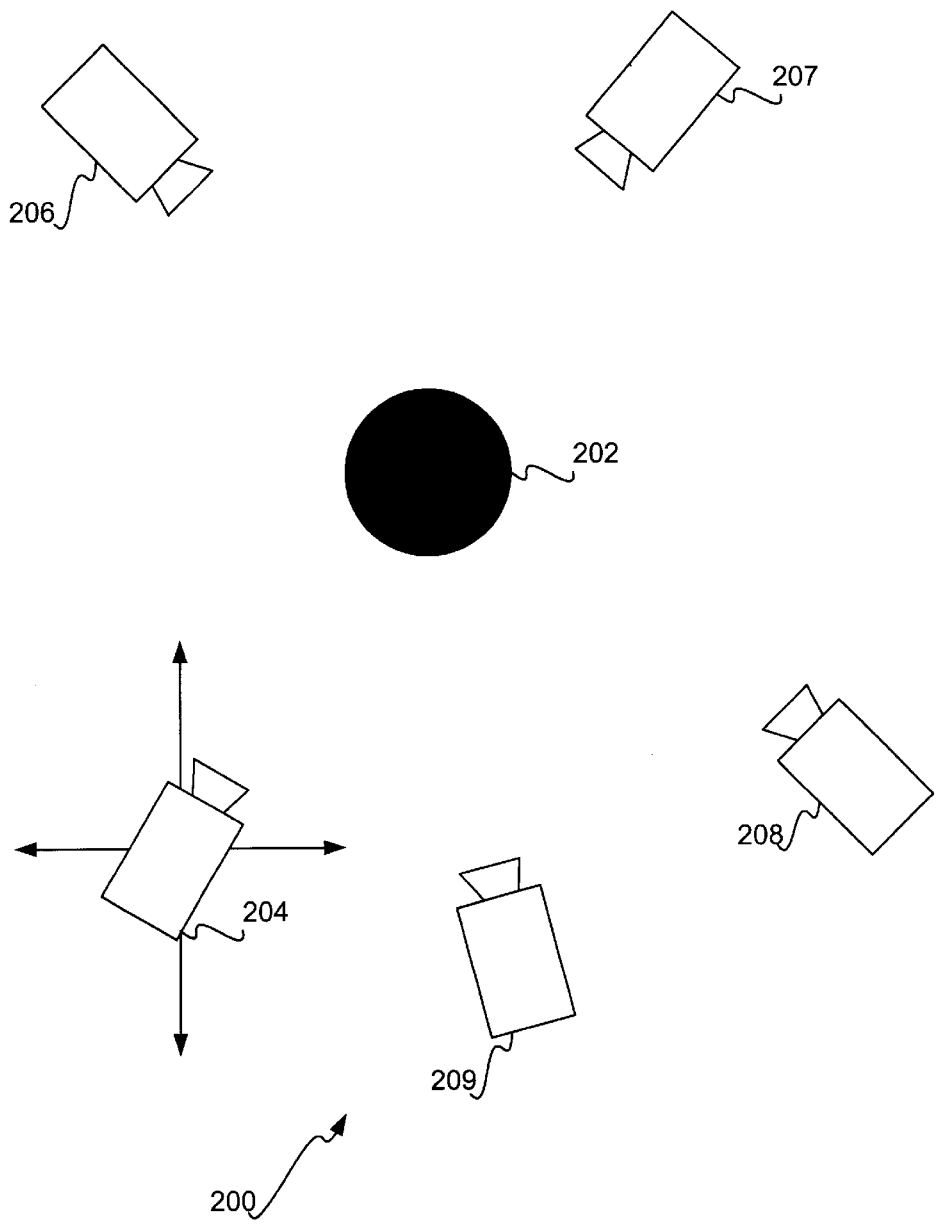
FIG. 2 is a top-view diagram of an example scene in conjunction with which image-based rendering (IBR) can be performed.

In this section of the detailed description, an overview of image-based rendering (IBR), such as can be performed in conjunction with embodiments of the invention, is described. In FIG. 2, a top-view diagram of a scene 200 including an object 202 is shown. The user is desirably able to move and rotate a virtual camera 204 throughout the scene 200, as indicated by the arrows extending from the camera 204, so that the virtual camera represents a desired viewpoint of the object 202. An image representing this viewpoint of the object 202 is then rendered. A scene is non-restrictively defined herein in a non-limited manner as a space or plane throughout which a virtual camera can be positioned, such that a new image can be rendered from the viewpoint of the virtual camera.

This image is rendered from already taken images from viewpoints of known real cameras 206, 207, 208, 209. As shown in FIG. 2, there are four such cameras 206–209, at various distances from and rotations relative to the object 202. However, this is for example and illustrative purposes only. A factor in IBR is to select the number and locations of the cameras 206–209, so that an image representing the viewpoint of the virtual camera 204 can be rendered based on the images representing the viewpoints of the cameras 206. Furthermore, as can be appreciated by those of ordinary skill within the art, rather than having a number of cameras acquiring images of the object 202 at various locations at the same or different times, one camera can instead be used to take images of the object 202 at various locations at different times, assuming that the object 202 does not change or move while the camera is being moved. Furthermore, it is emphasized that the diagram of FIG. 2 and this description made in conjunction therewith is for illustrative and background purposes only, as can be appreciated by those of ordinary skill within the art, for explanation of the invention, and does not represent a limitation or a restriction on any embodiment of the invention itself.

It is noted that the example of FIG. 2 described is only one type of image-based rendering (IBR). While embodiments of the invention are amenable to this type of IBR, the invention itself is not itself so limited. Specifically, the example of FIG. 2 is IBR in which the cameras are outside looking inwards on an object; Embodiments of the invention are also amenable to other types of IBR, such as cameras that are inside looking outwards within a scene.

Light-Field Rendering: Minimum Sampling Rate

Figure 4:
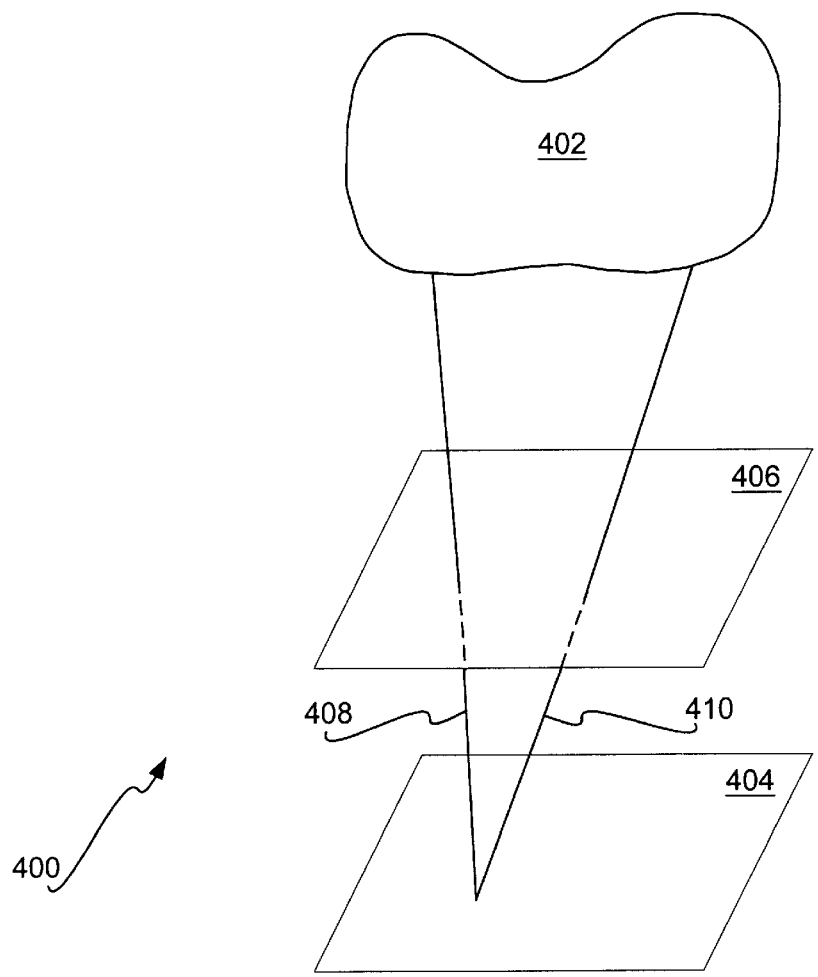
FIG. 4 is a diagram of a light-field representation according to an embodiment of the invention.

In this section of the detailed description, the minimum sampling rate necessary for light-field rendering is described. In light-field representation, for a standard two-plane database parameterization, there is a camera plane with a parameter (s, t), and a focal plane, with parameter (u, v). Thus, each ray in the parameterization is uniquely determined by the quadruple (u, v, s, t). This is shown in the diagram of FIG. 4, which for a light field 400 of a scene including the object 402, there are two planes, the camera plane 404, and the focal plane 406. Thus, any ray, such as the rays 408 and 410, has four parameters associated therewith—two parameters for where the ray intersects or emanates from the camera plan 404, and two parameters for where the ray intersects or goes through the focal plane 406.

A two-dimensional subspace given by fixed s and t values resembles an image, whereas fixed u and v values provide a hypothetical radiance function. Fixing t and v provides for an epipolar image. If the sample intervals along the s and t directions are $\Delta s$ and $\Delta t$, respectively, the horizontal and vertical disparities between two grid cameras in the (s, t) plane are determined by $k_1 \Delta s f/z$ and $k_2 \Delta t f/z$, respectively, where $f$ denotes the focal length of the camera, z is the depth value, and $(k_1 \Delta s, k_2 \Delta t)$ is the sample interval between two grid points (s, t).

In one embodiment, a pinhole camera model can be adopted to capture the light field, although the invention is not so limited. The camera sees a blurred version of the plenoptic function, because of finite camera resolution. A pixel value is a weighted integral of the illumination of the light arriving at the camera plane, or the convolution of the plenoptic function with a low-pass filter. The same filter is applied to all pixels. The shape of the filter is compactly supported, with the width of the support being the angular resolution d, so that the camera is taking samples of the convoluted plenoptic function. The angular resolution in the vertical and horizon directions is denoted as $\Delta u$ and $\Delta v$, respectively.

Figure 3:
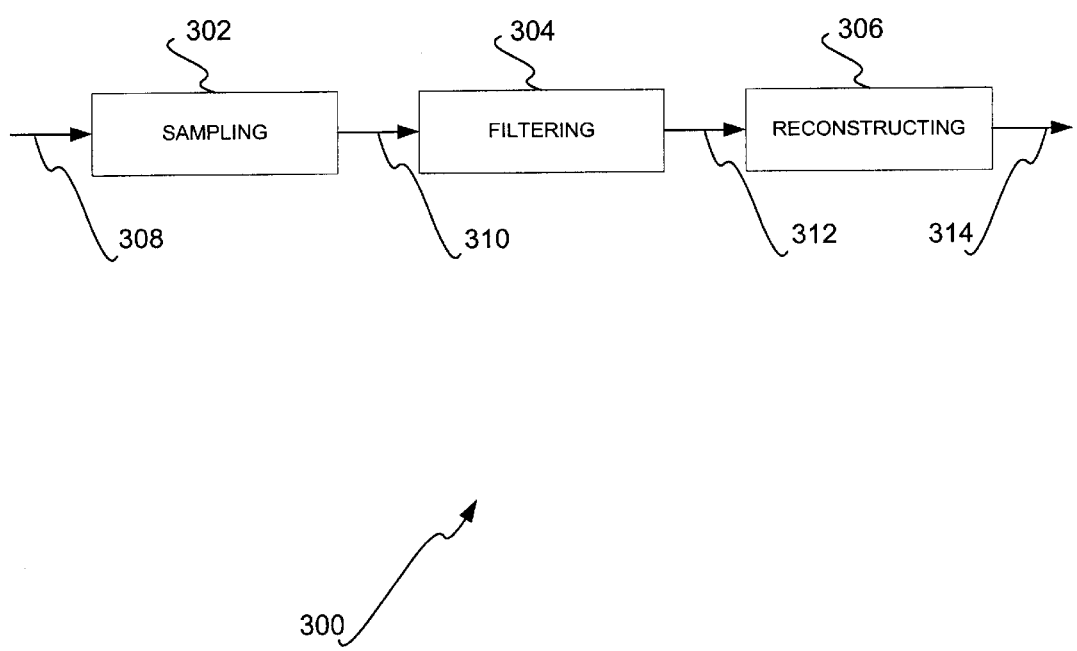
FIG. 3 is a diagram of a system according to an embodiment of the invention.

As shown in the diagram of FIG. 3, in one embodiment, a light-field system 300 has three components, a sampling component 302, a filtering component 304, and a reconstructing component 306. Each of the components 302, 304 and 306 can be implemented as software, hardware, or a combination of software and hardware. Light-field sampling as accomplished by the component 302 is represented by multiplying a four-dimensional (4D) light field with delta pulses, where the latter are closely related to the camera resolution and the maximum sampling density. The filtering performed by the component 304 is low pass, and used to band limit the sample images, so that visual aliasing does not occur in output images, although undesirable visual blur may not be able to be removed if the sampling rate is too low. Finally, reconstruction is performed by the component 306, to render novel images.

The input to the sampling component 302 is shown in FIG. 3 as a line 308, which represents a continuous light field l(u, v, s, t), where the parameter (s, t) represents a camera plane, and the parameter (u, v) represents a focal plane. Thus, each ray in the parameterization is uniquely determined by the light field. The output from the sampling component 302 is shown in FIG. 3 as a line 310, which represents a sampling pattern in the light field s(u, v, s, t). After filtering from the filtering component 304, the output is transformed into a sampled and filtered light field r(u, v, s, t). Finally, after a new image has been reconstructed by application of the reconstructing component 306, the output is, as shown in FIG. 3 as a line 314, the novel image i(u, v, s, t). Using the notation L, S, R, and I to represent the corresponding (frequency) spectra of l, s, r, i, respectively, the light-field reconstruction in the spatial domain can be determined as $$i(u,v,s,t)=r(u,v,s,t)*[l(u,v,s,t)*s(u,v,s,t)] \quad (1)$$

where * represents the convolution operation. This reconstruction can be transformed to the frequency domain as $$I(\Omega_u,\Omega_v,\Omega_s,\Omega_t)=R(\Omega_u,\Omega_v,\Omega_s,\Omega_t)[L(\Omega_u,\Omega_v,\Omega_s,\Omega_t)S(\Omega_u,\Omega_v,\Omega_s,\Omega_t)] \quad (2)$$

The spectral supports of the continuous light field $L(\Omega_u, \Omega_v,\Omega_s,\Omega_t)$ and the sampled light field $L(\Omega_u,\Omega_v,\Omega_s,\Omega_t)S(\Omega_u, \Omega_v,\Omega_s,\Omega_t)$ is now described. The model of the real scene is assumed to be Lambertian. Furthermore, the depth function of the scene is denoted as z(u, v, s, t). The radiance received at the virtual camera position (s, t) is given by $$l(u, v, s, t) = l\left(u - \frac{fs}{z(u, v, s, t)}, v - \frac{ft}{z(u, v, s, t)}, 0, 0\right)$$

and its Fourier transform is $$L(\Omega_u, \Omega_v, \Omega_s, \Omega_t) = \int_{-\infty}^{\infty}\int_{-\infty}^{\infty}\int_{-\infty}^{\infty} l(u, v, s, t)e^{-j\Omega^T x}dxe^{-j(\Omega_s s+\Omega_t t)}dsdt \quad (3)$$

where $x^T=[u,v]$ and $\Omega^T=[\Omega_u,\Omega_v]$. It is noted that determining the Fourier transform (3) is very complicated, and therefore, instead the bounds of the spectral support of the light fields are analyzed, as is now described.

The sampled light field $l_s$(u, v, s, t) is represented by $$l_s(u, v, s, t) = \quad (4)$$

$$l(u, v, s, t) \sum_{n_1,n_2,k_1,k_2} \delta(u-n_1\Delta u)\delta(u-n_2\Delta v)\delta(u-k_1\Delta s)\delta(u-k_2\Delta t)$$

having the Fourier transform $$L_s(\Omega_u, \Omega_v, \Omega_s, \Omega_t) = \quad (5)$$

$$\sum_{m_1,m_2,l_1,l_2} L\left(\Omega_u - \frac{2\pi m_1}{\Delta u}, \Omega_v - \frac{2\pi m_2}{\Delta v}, \Omega_s - \frac{2\pi l_1}{\Delta s}, \Omega_t - \frac{2\pi l_2}{\Delta t}\right)$$

Equation (5) indicates that replicas of L appear, centered at the four-dimensional grid points $$(2\pi m_1/\Delta u, 2\pi m_2/\Delta v, 2\pi l_1/\Delta s, 2\pi l_2/\Delta t).$$

When L is not band limited outside the Nyquist frequencies, some replicas will intrude during reconstruction, creating aliasing artifacts. In general, there are two ways to prevent such effects. First, the sampling rate can be increased, where the higher the sampling rate, the less the aliasing effects. Second, the replicas can be filtered out by choosing an appropriate filter kernel.

To specifically analyze the bounds in spectral support, a model of global constant depth is first considered—that is, a scene model in which every point is at a constant depth ($z_0$). The first frame is selected as the reference frame, and l(u, v, 0, 0) denotes the two-dimensional intensity distribution within the reference frame. The Fourier transform of the light field with constant depth is $$L_s(\Omega_u, \Omega_v, \Omega_s, \Omega_t) = \int_{-\infty}^{\infty}\int_{-\infty}^{\infty} l(u, v, 0, 0)e^{-j(\Omega_u u + \Omega_v v)}dudv \int_{-\infty}^{\infty} e^{-j(\frac{f}{z_0}\Omega_u + \Omega_s)s}ds \int_{-\infty}^{\infty} e^{-j(\frac{f}{z_0}\Omega_v + \Omega_t)t}dt$$

$$= L'(\Omega_u, \Omega_v)\delta\left(\frac{f}{z_0}\Omega_u + \Omega_s\right)\delta\left(\frac{f}{z_0}\Omega_v + \Omega_t\right)$$

where $L'(\Omega_u,\Omega_v)$ is the two-dimensional Fourier transform of the continuous signal l(u, v, 0, 0) and $\delta(\cdot)$ is the one-dimensional Dirac delta function. For sake of clarity, the following description focuses on the projection of the support of $L(\Omega_u,\Omega_v,\Omega_s,\Omega_t)$ onto the $L(\Omega_v,\Omega_t)$ plane. Because of the frequency independence between $Q_s$ and $Q_t$, it is straightforward to extend the two-dimensional spectral analysis to four-dimensional space, as can be appreciated by those of ordinary skill within the art.

Under the constant depth model, the spectral support of continuous light field signals $L(\Omega_v,\Omega_t)$ is defined by a line $\Omega_v f/z_0+\Omega_t=0$. The corresponding spectral support of sampled light field signals is such that there are replicas that appear at intervals $2\pi m_2/\Delta v$ and $2\pi l_2/\Delta t$, in the $\Omega_v$ and $\Omega_t$ directions, respectively. Thus, a filter is desirably designed to prevent any overlap in the frequency domain ($\Omega_t$ and $\Omega_v$), so that the reconstructed images are free of aliasing.

According to the Nyquist sampling theorem known within the art, for a signal to be reconstructed without aliasing, the sampling frequency must be greater than the Nyquist rate, which is two times the Nyquist frequency. The Nyquist frequencies in the frequency domain ($\Omega_v,\Omega_t$) are determined by two factors, the camera resolution ($\Omega_v$), and the texture complexity of the images, represented by the cut-off frequency $B_v^s$. Specifically, the Nyquist frequency $B_v$ in the $\Omega_v$ direction is $$B_v = \min\left(B_v^s, \frac{1}{\Delta v}\right), \quad (6)$$

and the cutoff frequency $B_t$ is $$B_t = \frac{f}{z_0} B_v \quad (7)$$

since an optimal anti-aliasing filter under the constant depth model desirably takes the shape of a line $$\frac{f}{z_0}\Omega_v + \Omega_t = 0$$

in the $(\Omega_v, \Omega_t)$, where the depth $z_0$ is known.

The cut-off frequency $B_v^s$ can be determined from the spectral support of the sampled light field. By setting the high-frequency part of the spectrum to zero, so that the cut-off frequency is smaller than the inverse of the camera resolution, the sampling frequency can be reduced. One manner by which the cut-off frequency can be reduced is to apply a low-pass filter to the input v-t image.

Beyond a single depth model, a more complex environment can be approximated with a depth model of truncated and piecemeal constant segments. For example, the depth can be partitioned as $z(v)=z_i$, for $v_i \leq v < v_{i+1}, i=1, \ldots, N_d$, where $v_1$ and $v_{N_{d+1}}$ are the smallest and largest v of interest, respectively. Then $$l(v,t)=l_i(v-ft/z_i), \text{ if } v_i \leq v < v_{i+1}$$

and $$L(\Omega_v, \Omega_t) = \quad (8)$$

$$\sum_{i=1}^{N_d} \exp\left(-j\frac{v_i + v_{i+1}}{2}(\Omega_v + \Omega_t z_i/f)\right) \frac{2\sin\left(\frac{v_{i+1} - v_i}{2}(\Omega_v + \Omega_t z_i/f)\right)}{f\Omega_v/z_i + \Omega_t}$$

$$L_i(-\Omega_t z_i/f) \equiv \sum_{i=1}^{N_d} Q_i(\Omega_v, \Omega_t)$$

where $L_i$ is the one-dimensional transform of $l_i$. It is noted that in equation (8), because the function $$\frac{\sin x}{x}$$

decays quickly, and $L_i(-\Omega_t z_i/f)$ also decreases quickly when $|\Omega_t f|$ grows, the spectral support of $\Omega_i(\Omega_v, \Omega_t)$ appears as a narrow ellipse.

Next, the truncation effects along the t direction are analyzed. The effect of the truncation windows demonstrably occurs where the radiance emitted by the same scene point forms a line with the same intensity, based on the Lambertian assumption. Occlusion can be regarded as a special example of truncation effects. For sake of simplicity, the scene is modeled as an impulse function, $$l(v,t)=l(v-ft/z_0,0)=\delta(v-ft/z_0),$$

then $$L(\Omega_v, \Omega_t) = \exp\left(-j\frac{t_1' + t_2'}{2}(\Omega_f f/z_0 + \Omega_t)\right)\frac{2\sin\left[\frac{t_2' - t_1'}{2}(\Omega_v f/z_0 + \Omega_t)\right]}{(\Omega_v f/z_0 + \Omega_t)} \quad (9)$$

In equation (9), because the function $$\frac{\sin x}{x}$$

oscillates and decays quickly outside the first lobe, the width of the first lobe, $$\frac{2\sin\left[\frac{t_2' - t_1'}{2}(\Omega_v f/z_0 + \Omega_t)\right]}{(\Omega_v f/z_0 + \Omega_t)}$$

can be used as the width of the spectral support $L(\Omega_v, \Omega_t)$. Therefore, the width of the spectral support of $L(\Omega_v, \Omega_t)$ is $$w_0 = \frac{4\pi}{(t_2' - t_1')\sqrt{1 + f^2/z_0^2}}.$$

When $t_2'-t_1'$ becomes very small, the artifacts caused by occlusion are significant because the width of spectral support becomes very large. Furthermore, it is noted that the length of the line $t_2'-t_1'$ is determined not only by the occlusion, but also by the number of cameras. Therefore, when very few cameras are used, aliasing effects are difficult to avoid around the boundaries of objects. Thus, the width of the spectral support is under control when the truncation window is sufficiently large—that is, if the occlusion is not significant.

Next, a spatially varying depth model is described. For any scene with a depth between the minimum $z_2$ and the maximum $z_1$, its continuous spectral support will be nearly bounded in the frequency domain by a parallelogram with four vertices: $(-B_v, f/z_1, B_v), (-B_v, f/z_2, B_v), (B_v, f/z_1, -B_v), (B_v, f/z_2, -B_v)$. When the width of the spectral support is small, the spectral support is approximately bounded by two lines:

$$\Omega_v f/z_2 + \Omega_t = 0 \text{ and } \Omega_v f/z_1 + \Omega_t = 0.$$

It is noted that geometrical information can assist in reducing the bounds of the spectral support in the frequency domain. In particular, the optimal reconstruction filter is determined precisely by the bounds of the spectral support. These bounds are functions of the minimum and maximum depths of the scene. If some information on the scene geometry is known, then it can be decomposed into a collection of constant depth models on a block-by-block basis. Each model will have a much tighter bound than the original bound, depending on the accuracy of the geometry. For a reconstruction filter using a constant depth, the optimal filter particularly can be designed if the depth is kept constant at $$z_c = 2\frac{z_{min} z_{max}}{z_{min} + z_{max}}$$

where the depth range is $[z_{min}, z_{max}]$.

The minimum sampling rate for light-field rendering is now described. The minimum interval by which the replicas of spectral support can be spaced together is determined by the optimal reconstruction filter. Specifically, with the optimal reconstruction filter at the constant depth $z_c$, the maximum allowable virtual camera space is $$\Delta t_{\max} = \frac{1}{2K_{\Omega_v} f h_d} \quad (10)$$

where $$K_{\Omega_v} = \min(B_v, 1/\delta_v),$$

$$h_d = \frac{1}{z_{\min}} - \frac{1}{z_{\max}}.$$

$B_v$ is the cut-off frequency for the light-field signal, which is determined by the scene texture distribution, and the resolution of the sampling camera, $\Delta_v$. The formulation also takes the rendering output resolution $\delta_v$ into account since rendering at a resolution higher than the output resolution is unnecessary.

It is noted that the minimum sampling rate is equivalent to the maximum camera spacing $\Delta t_{max}$. The maximum camera spacing is larger when the scene texture variation becomes more uniform, or when the rendering camera resolution becomes lower. In addition, the minimum sampling rate is determined by the relative depth variation seen by the sampling camera, $(f(z_m^{-1}-z_{max}^{-1}))$. The closer the object is to the camera, the smaller the $z_{min}$ is, and the higher the minimum sample rate is. As $f$ increases, the sampling camera covers a more detailed scene, but the minimum sampling rate needed increases. Thus, the minimum sampling rate is closely related to the knowledge about the scene geometry.

Image-Based Rendering (IBR): Minimum Sampling Curve

In this section of the detailed description, the minimum sampling curve for image-based rendering (IBR) in general is described. As noted in the previous section of the detailed description, the minimum sampling rate for light-field rendering is closely related to the knowledge about the scene geometry. Therefore, the minimum sampling problem can be considered not in the image space alone, but in the joint image-and-geometry space, as is now described. Since processor speed, memory, storage space, graphics capability, network bandwidth, etc., that is used vary from user to user, a user may desire to seek a particularly optimal balance between image samples and depth layers for a given rendering quality.

Figure 5:
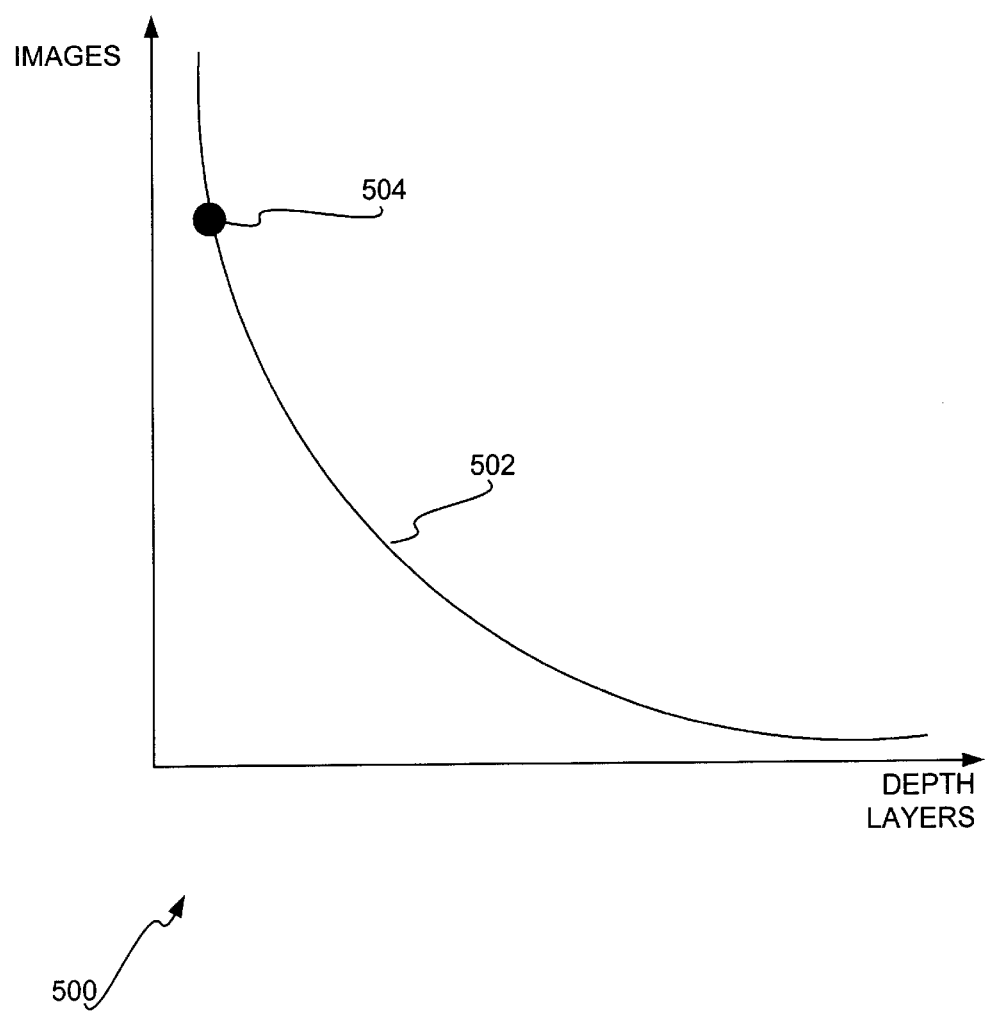
FIG. 5 is diagram of a graph of a minimum sampling curve on which a minimum sampling point is shown, according to one embodiment of the invention.
Figure 6:
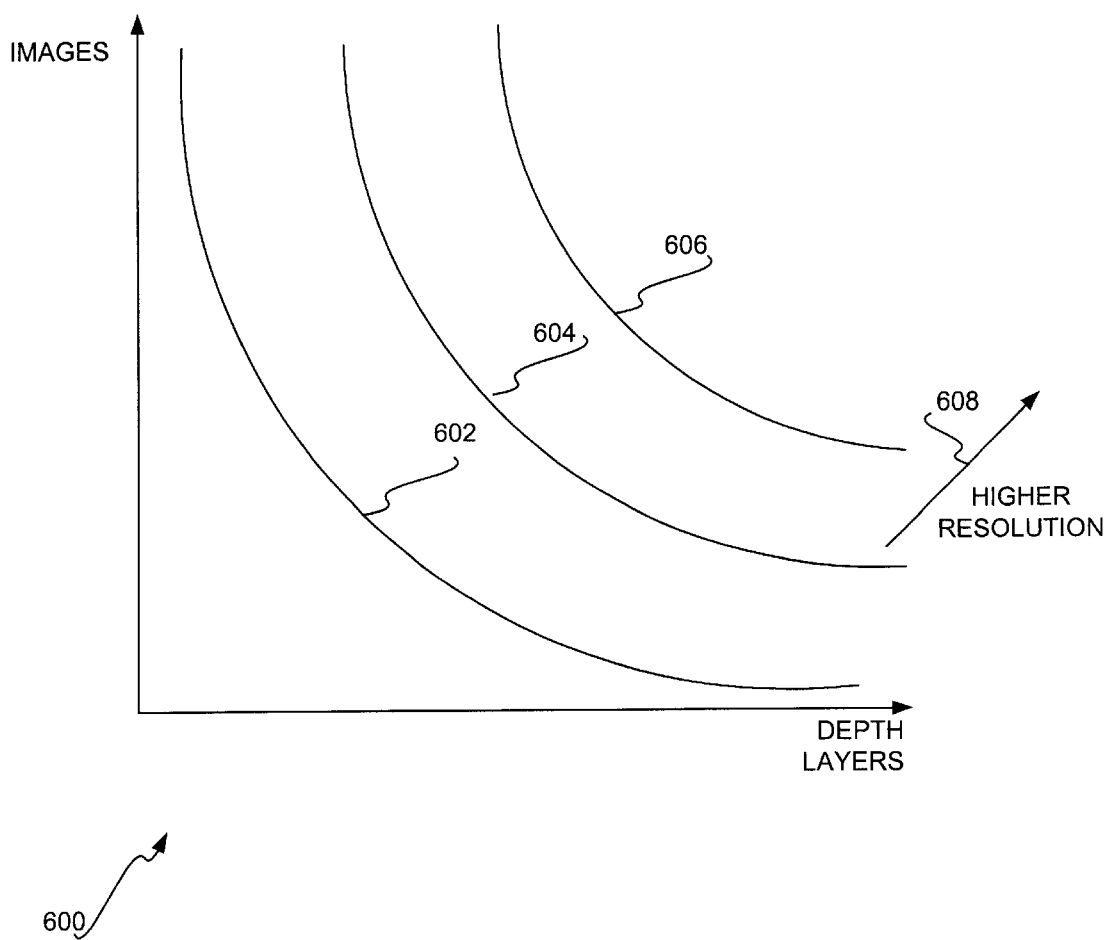
FIG. 6 is a diagram of a graph of multiple minimum sampling curves, according to increasingly higher rendering resolutions, according to one embodiment of the invention.

It is noted that the minimum sampling rate for light-field rendering represents essentially only a sampling point in the joint image-and-geometry space, in which little depth information has been utilized. As more geometrical information becomes available, fewer images are necessary at any given rendering resolution. This is shown in the graph 500 of the diagram of FIG. 5, on the minimum sampling curve 502, the minimum sampling rate is represented as the point 504. By comparison, in the graph 600 of the diagram of FIG. 6, three minimum sampling curves 602, 604 and 606 are shown, representing the curves for increasingly higher rendering resolutions, as represented by the arrow 608 of FIG. 6.

The minimum sampling curve is described in two contexts: where accurate depth information exists, and where uncertain depth information is present. With respect to the former, from an initial set of accurate geometric data, a scene can be decomposed into multiple layers of sub-regions. Accordingly, the entire spectral support can be decomposed into multiple layers, due to correspondence between a constant depth and its spectral support. For each decomposed spectral support, an optimal constant depth filter can be designed. Specifically, for each depth layer $i=1, \ldots, N_d$, the depth of the optimal filter is described as $$z_{\langle i, N_d \rangle} = \frac{z_{\max} z_{\min}}{\lambda_{\langle i, N_d \rangle} z_{\max} + (1 - \lambda_{\langle i, N_d \rangle}) z_{\min}} \quad (11)$$

where $$\lambda_{\langle i, N_d \rangle} = \frac{i - 0.5}{N_d}.$$

Therefore, a depth value can be assigned to one of the depth layers $$z = z_{\langle i, N_d \rangle} \quad (12)$$

if $$z_{(i,N_d)}^{-1} - h_d N_d^{-1}/2 \leq z^{-1} \leq z_{(i,N_d)}^{-1} + h_d^{-1}/2 \quad (13)$$

where $h_d = z_{min}^{-1} - z_{max}^{-1}$.

Minimum sampling in a joint image and accurate depth space occurs when $$N_d = 2K_{\Omega_v} f h_d \Delta t, N_d \geq 1 \quad (14)$$

where $N_d$ and $\Delta t$ are the number of depth layers and the sampling interval along the t direction, respectively.

The choice about how many depth layers should be used for scene representation is a function of the sampling and rendering camera resolution, the scene's texture complexity, the spacing of the sampling cameras, and the depth variation relative to the focal length.

Based on the above description of the minimum sampling curve for the joint image-and-depth space, three applications are described in particular, although those of ordinary skill within the art can appreciate that the invention is not limited to any particular application. A first application is image-based geometry simplification. That is, given the appropriate number of image samples an average user can afford (in terms of bandwidth restrictions, storage space restrictions, etc.), the minimum sampling curve in the joint space determines how much depth information is needed. Thus, embodiments of the invention simplify the original complex geometrical model to the minimum model that still guarantees the same rendering quality.

This first application is described now in more detail. Prior to embodiments of the invention, there was no manner by which to relate the depth information for a particular geometrical model needed with the number of image samples that are able to be provided. Thus, in order to ensure quality of rendering, typically over-information was provided in terms of the depth information, such that some of the provided depth information was redundant. However, with embodiments of the invention, the amount of depth information precisely required for a given rendering resolution, assuming a given number of images (as a result of bandwidth restrictions, storage space restrictions, etc.), is determined from the minimum sampling curve of embodiments of the invention. Thus, over-information in terms of depth information is unnecessary, and no redundant information is needed. That is, the minimum amount of information to provide a certain rendering quality is determined precisely.

A second application is geometry-based image database reduction. That is, given the number of depth layers available, the number of image samples needed can also be reduced to the minimum necessary for a given rendering resolution. This reduction is particularly useful for light-field rendering. This is similar to the first application. Prior to the invention, when a given geometrical model and hence depth information were provided, usually over-information was then acquired in terms of the number of images, so as to guarantee a certain desired level of rendering quality, which resulted in redundancy of the number of images acquired. In the case of light-field rendering, where there is a single constant depth level, this situation was particularly acute. Because the prior art does not provide for any mechanism by which to determine precisely the number of images necessary to obtain a certain desired level of rendering quality given depth information, users of the prior art tend to over sample, and acquire too many images. However, embodiments of the invention provide for determining the precise number of images necessary given the known depth information—such that redundancy in image information is prevented.

A third application is level of details (LOD) in the joint image-and-depth space. LOD analysis is known in the art. However, LOD in geometry space can be applied to the joint image-and-geometry space in accordance with embodiments of the invention. When an object is farther away, its relative size on the screen diminishes such that the number of required image samples or the number of required depth layers can be reduced accordingly. Zooming in and panning out of objects thus specify a dynamic change in the number of image samples or depth layers. That is, embodiments of the invention allow for less or more information to be acquired, depending on how far a given object is zoomed in or panned out as to viewpoint. Within the prior art, for example, it is typically common to obtain the same amount of information regardless of the distance of the viewpoint (virtual camera) to the object. Embodiments of the invention, by providing a precise determination amount of information needed, eliminate over-information, and thus over-sampling of images, or over-complex modeling geometry (depth information).

The minimum sampling curve in the context where uncertain depth information is present is now described. Specifically, minimum sampling with depth uncertainty describes the relationship between the number of image samples, and noise depth and depth uncertainty. This is useful, because in general recovered geometries for real environments are noisy due to modeling difficulty. In addition, geometrical uncertainty exists when an accurate model is simplified.

Therefore, given the correct depth $z_0$, an estimated depth $z_e$, and a depth uncertainty $\Delta\eta$, the accurate depth value should be located within the range $(z_e-\Delta\eta, z_e+\Delta\eta)$. The maximum camera spacing is determined as $$\Delta t_{\max} = \begin{cases} \dfrac{z_0(z_e - \Delta\eta)}{2fK_{\Omega_v}(z_0 - z_e + \Delta\eta)} & \text{if } z_e \le z_0 \\ \dfrac{z_0(z_e + \Delta\eta)}{2fK_{\Omega_v}(z_e - z_0 + \Delta\eta)} & \text{otherwise} \end{cases} \quad (15)$$

The actual depth value $z_0$ is frequently unknown in advance for real environments. The highest sampling rate occurs when the estimation error is at its maximum, or on the error bound. Thus, considering the recovered depth value in the entire scene, and setting $z_0 = z_e + \Delta\eta$ if $z_e < z_0$, $$\Delta t_{\max} = \min_{z_e} \frac{(z_e + \Delta\eta)(z_e - \Delta\eta)}{4fK_{\Omega_v}\Delta\eta}. \quad (16)$$

Based on the above description of the minimum sampling curve for the joint image-and-depth space under noisy and/or uncertain depth conditions, two applications are described in particular, although those of ordinary skill within the art can appreciate that the invention is not limited to any particular application. A first application is minimum sampling rate. That is, for a specific light-field rendering with no depth maps, or with noisy depth maps, the minimum number of images for antialiased light-field rendering can be determined. Redundant image samples can thus be discarded from the sampled database for such rendering. That is, by providing the tolerance level of the error, even if noisy or depth information is present, a precise number of images necessary for a particular desired level of rendering quality can be determined, eliminating over-information and oversampling, and reducing to a minimum the amount of information needed to achieve the desired level of rendering quality.

A second application is rendering-driven vision reconstruction. Many general vision approaches within the prior art do not recover accurate scene depth. Thus, given the number of image samples, embodiments of the invention can provide for how accurately the depth should be recovered, to guarantee a desired level of rendering quality. This second application is the opposite situation of the first application described in the previous paragraph. Where the number of image samples is known, and a desired level of rendering quality is desired, embodiments of the invention provide for a precise determination of the accuracy of the geometry of the model—that is, the number of depth levels needed to ensure the desired level of rendering quality. It is noted that rendering-driven vision reconstruction differs from classical geometry-driven vision reconstruction in that the former is guided by the tolerance on depth accuracy that the rendering process can have.

Methods and Systems

In this section of the detailed description, methods and systems according to varying embodiments of the invention are described. The description herein relies on the minimum sampling rate and curve descriptions provided in the preceding two sections of the detailed description. In one embodiment, the methods in particular can be computer-implemented methods. The computer-implemented methods are desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Figure 7:
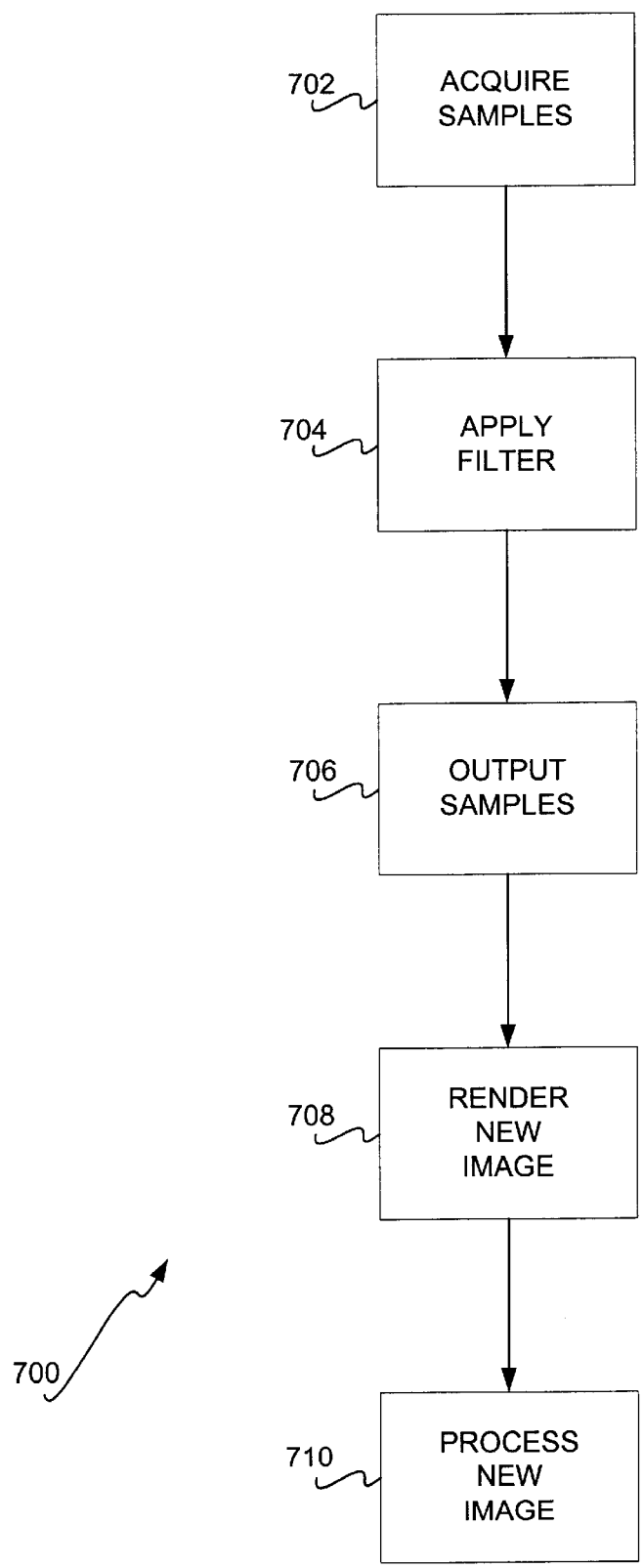
FIG. 7 is a flowchart of a method according to an embodiment of the invention; and, FIG. 8 is a diagram of a system according to an embodiment of the invention.

Referring to FIG. 7, a flowchart of a method 700 according to an embodiment of the invention is shown. In 702, images of a scene, such as that which includes an object (although the invention is not so limited) are acquired. For example, for light-field rendering, the images are acquired in accordance with a minimum sampling rate as has been described. As another example, for image-based rendering, the images are acquired utilizing a minimum sampling rate and a number of depth layers in accordance with a minimum sampling curve as has been described. In the latter example, the depth information may be known, unknown, or uncertain. In 704, a filter, such as a low-pass filter, is applied to the samples, to band-limit the samples. 704 is particularly performed in the context of light-field rendering, although it can also be performed in the context of image-based rendering more generally, too.

In 706, the samples that have been acquired are output. This can include, as non-limiting examples, storing the samples on a medium such as a hard disk drive or other storage device; and/or, transmitting the samples from one computerized device, such as a computer, to another computerized device, such as another computer—for example, over the Internet or other network. In 708, a new (or, novel) image is rendered (that is, reconstructed), using the samples acquired in 702. Rendering can be accomplished by light-field rendering or another type of image-based rendering. Finally, in 710, the new rendered image is processed. This can include, as non-limiting examples, displaying the new image, such as on a display device; and/or, storing the new image on a medium such as a hard disk drive or other storage device.

Figure 8:
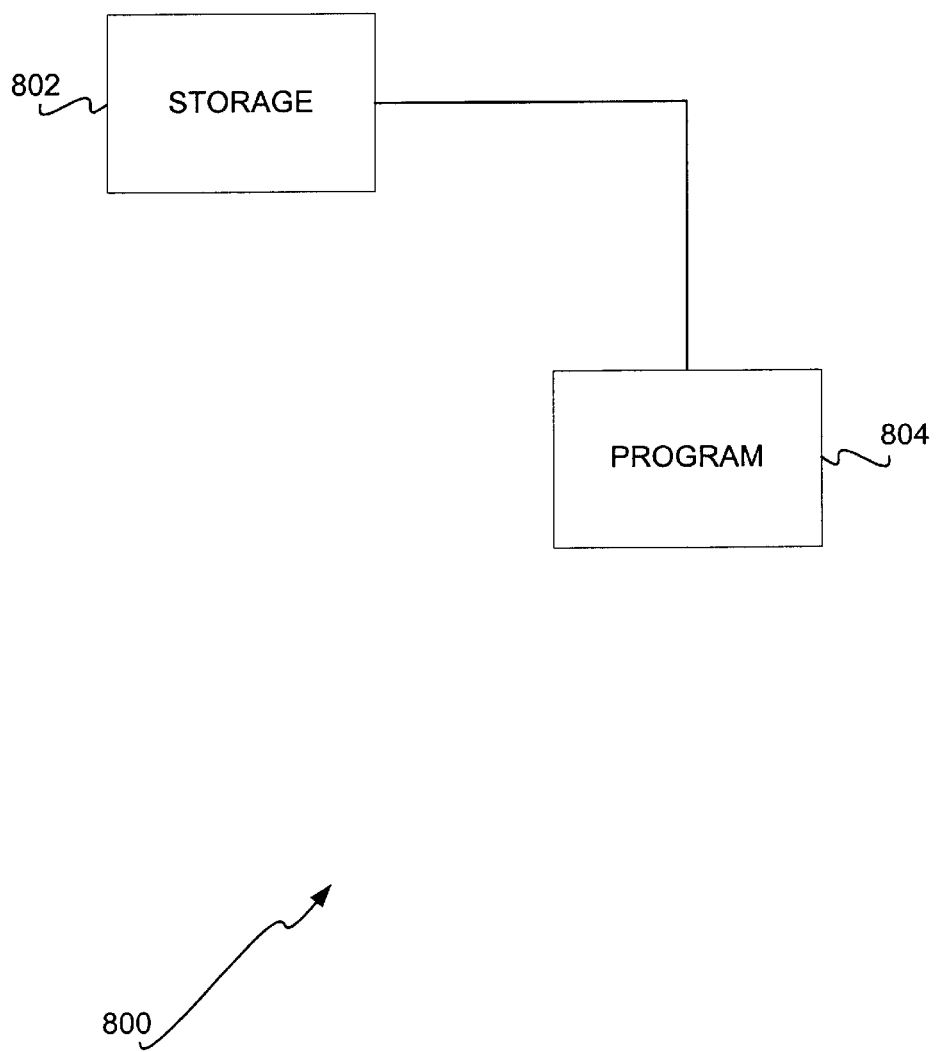

Referring finally to FIG. 8, a diagram of a system 800 according to an embodiment of the invention is shown. The system 800 includes a storage medium 802, and a computer program 804. The system 800 can in one embodiment be a computer, such as the computer of FIG. 1 as has been described in a previous section of the detailed description, although the invention is not so limited.

The storage medium 800 is designed to store data representing samples. These samples may have been acquired, for example, for light-field rendering, where the images are acquired in accordance with a minimum sampling rate as has been described. As another example, for image-based rendering, the images may have been acquired utilizing a minimum sampling rate and a number of depth layers in accordance with a minimum sampling curve as has been described. In the latter example, the depth information may be known, unknown, or uncertain. As stored on the medium 800, the images may or may not have been subjected to a filter to band limit them. The invention is not limited to a particular type of medium 800, but can include memory, such as read-only memory (ROM) or read-access memory (RAM), a hard disk drive, or a removable storage such as a floppy disk or a CD-ROM.

The program 804 is designed to render a new image based on the samples that have been stored as data on the medium 802. In one embodiment, the program 804 is further designed to display the new image, and/or store the new image on the storage medium 802. The program 804 can in one embodiment be executed by a processor of the system 800, from a medium thereof (such as the medium 802, or another medium).

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:
   determining a minimum sampling rate for acquisition of a plurality of samples of a scene for light-field rendering utilizing a minimum sampling rate determined in accordance with $$\Delta t_{max} = \frac{1}{2K_{\Omega_v} f h_d},$$

where $K_{\Omega_v}$ accounts for a light-field signal cut-off frequency, a sampling camera resolution and an output resolution, $f$ specifies a sampling camera focal length, and $h_d$ specifies a light-field depth range; and, acquiring the plurality of samples of the scene for light-field rendering in accordance with the minimum sampling rate as determined.

2. The method of claim 1, further comprising outputting the plurality of samples of the scene.

3. The method of claim 2, wherein outputting the plurality of samples of the scene comprises at least one of: storing the plurality of samples on a medium; and, transmitting the plurality of samples from a first computerized device to a second computerized device.

4. The method of claim 1, further comprising reconstructing a new image of the scene based on the plurality of samples acquired.

5. The method of claim 1, further comprises applying a low-pass filter on the plurality of samples to band-limit the plurality of samples.

6. The method of claim 1, wherein $$K_{\Omega_v} = \min\left(B_v, \frac{1}{\delta_v}\right),$$

where $B_v$ specifies the light field signal cut-off frequency, and $\delta_v$ specifies the output resolution.

7. The method of claim 1, wherein $$h_d = \frac{1}{z_{min}} - \frac{1}{z_{max}},$$

where $z_{min}$ specifies a minimum light-field depth and $z_{max}$ specifies a maximum light-field depth, such that the light-field depth range is $z_{max}-z_{min}$.

8. A machine-readable medium having instructions stored thereon for execution by a processor to perform a method comprising:

reconstructing a new image of a scene using light-field rendering based on a plurality of samples acquired utilizing a minimum sampling rate determined in accordance with $$\Delta t_{max} = \frac{1}{2K_{\Omega_v} f h_d},$$

where $K_{\Omega_v}$ accounts for a light-field signal cut-off frequency, a sampling camera resolution and an output resolution, $f$ specifies a sampling camera focal length, and $h_d$ specifies a light-field depth range; and, processing the new image.

9. The medium of claim 8, wherein processing the new image comprises at least one of: displaying the new image; and, storing the new image on a medium.

10. The medium of claim 8, wherein $$K_{\Omega_v} = \min\left(B_v, \frac{1}{\delta_v}\right),$$

where $B_v$ specifies the light field signal cut-off frequency, and $\delta_v$ specifies the output resolution.

11. The medium of claim 8, wherein $$h_d = \frac{1}{z_{\min}} - \frac{1}{z_{\max}},$$

where $z_{min}$ specifies a minimum light-field depth and $z_{max}$ specifies a maximum light-field depth, such that the light-field depth range is $z_{max}-z_{min}$.

12. A computer comprising:
a storage medium designed to store data representing a plurality of samples for light-field rendering acquired utilizing a minimum sampling rate determined in accordance with $$\Delta t_{\max} = \frac{1}{2K_{\Omega_v} f h_d},$$

where $K_{\Omega_v}$ accounts for a light-field signal cut-off frequency, a sampling camera resolution and an output resolution, $f$ specifies a sampling camera focal length, and $h_d$ specifies a light-field depth range; and,
a computer program designed to render a new image based on the plurality of samples stored as data on the storage medium.

13. The computer of claim 12, wherein the computer program is further designed to at least one of: display the new image, and store the new image on the storage medium.

14. The computer of claim 12, wherein $$K_{\Omega_v} = \min\left(B_v, \frac{1}{\delta_v}\right),$$

where $B_v$ specifies the light field signal cut-off frequency, and $\delta_v$ specifies the output resolution.

15. The computer of claim 12, wherein $$h_d = \frac{1}{z_{\min}} - \frac{1}{z_{\max}},$$

where $z_{min}$ specifies a minimum light-field depth and $z_{max}$ specifies a maximum light-field depth, such that the light-field depth range is $z_{max}-z_{min}$.

16. A computer-implemented method comprising:
determining a minimum sampling rate and a number of depth layers for acquisition of a plurality of samples of a scene for image-based rendering constrained by $N_d=2K_{\Omega_v}fh_d\Delta t$, $N_d \geq 1$, where $N_d$ is the number of depth layers, $\Delta t$ specifies a sampling interval along a t direction, $K_{\Omega_v}$ accounts for a signal cut-off frequency, a sampling camera resolution and an output resolution, $f$ specifies a sampling camera focal length, $h_d$ specifies a depth range;
acquiring the plurality of samples of the scene for light-field rendering in accordance with the minimum sampling rate and the number of depth layers as determined.

17. The method of claim 16, further comprising outputting the plurality of samples of the scene.

18. The method of claim 17, wherein outputting the plurality of samples of the scene comprises at least one of: storing the plurality of samples on a medium; and, transmitting the plurality of samples from a first computerized device to a second computerized device.

19. The method of claim 16, further comprising reconstructing a new image of the scene based on the plurality of samples acquired.

20. The method of claim 16, further comprises applying a low-pass filter on the plurality of samples to band-limit the plurality of samples.

21. The method of claim 16, wherein $$K_{\Omega_v} = \min\left(B_v, \frac{1}{\delta_v}\right),$$

where $B_v$ specifies the signal cut-off frequency, and $\delta_v$ specifies the output resolution.

22. The method of claim 16, wherein $$h_d = \frac{1}{z_{\min}} - \frac{1}{z_{\max}},$$

where $z_{min}$ specifies a minimum depth and $z_{max}$ specifies a maximum depth, such that the depth range is $z_{max}-z_{min}$.

23. A machine-readable medium having instructions stored thereon for execution by a processor to perform a method comprising:
reconstructing a new image of a scene using image-based rendering based on a plurality of samples acquired utilizing a minimum sampling rate and a number of depth layers constrained by $N_d=2K_{\Omega_v}fh_d\Delta t$, $N_d \geq 1$, where $N_d$ is the number of depth layers, $\Delta t$ specifies a sampling interval along a t direction, $K_{\Omega_v}$ accounts for a signal cut-off frequency, a sampling camera resolution and an output resolution, $f$ specifies a sampling camera focal length, $h_d$ specifies a depth range; and,
processing the new image.

24. The medium of claim 23, wherein processing the new image comprises at least one of: displaying the new image; and, storing the new image on a medium.

25. The medium of claim 23, wherein $$K_{\Omega_v} = \min\left(B_v, \frac{1}{\delta_v}\right),$$

where $B_v$ specifies the signal cut-off frequency, and $\delta_v$ specifies the output resolution.

26. The medium of claim 23, wherein $$h_d = \frac{1}{z_{\min}} - \frac{1}{z_{\max}},$$

where $z_{min}$ in specifies a minimum depth and $z_{max}$ specifies a maximum depth, such that the depth range is $z_{max}-z_{min}$.

27. A computer comprising:
a storage medium designed to store data representing a plurality of samples for image-based rendering acquired utilizing a minimum sampling rate and a number of depth layers constrained by $N_d=2K_{\Omega_v}fh_d\Delta t$, $N_d \geq 1$, where $N_d$ is the number of depth layers, $\Delta t$ specifies a sampling interval along a t direction, $K_{\Omega_v}$ accounts for a signal cut-off frequency, a sampling camera resolution and an output resolution, $f$ specifies a sampling camera focal length, $h_d$ specifies a depth range; and,
a computer program designed to render a new image based on the plurality of samples stored as data on the storage medium.

28. The computer of claim 27, wherein the computer program is further designed to at least one of: display the new image, and store the new image on the storage medium.

29. The computer of claim 27, wherein $$K_{\Omega_v} = \min\left(B_v, \frac{1}{\delta_v}\right),$$

where $B_v$ specifies the signal cut-off frequency, and $\delta_v$ specifies the output resolution.

30. The computer of claim 27, wherein $$h_d = \frac{1}{z_{\min}} - \frac{1}{z_{\max}},$$

where $z_{min}$ specifies a minimum depth and $z_{max}$ specifies a maximum depth, such that the depth range is $z_{max}-z_{min}$.

31. A computer-implemented method comprising: acquiring a plurality of samples of a scene for image-based rendering, under uncertain depth, utilizing a minimum sampling rate determined by $$\Delta t_{\max} = \min_{z_e} \frac{(z_e + \Delta\eta)(z_e - \Delta\eta)}{4fK_{\Omega_v}\Delta\eta},$$

where $\Delta t_{max}$ specifies a maximum sampling interval along a t direction, $K_{\Omega_v}$ accounts for a signal cut-off frequency, a sampling camera resolution and an output resolution, $f$ specifies a sampling camera focal length, $z_e$ specifies an estimated depth, and $\Delta\eta$ specifies a depth error; and,
outputting the plurality of samples of the scene.

32. The method of claim 31, wherein outputting the plurality of samples of the scene comprises at least one of: storing the plurality of samples on a medium; and, transmitting the plurality of samples from a first computerized device to a second computerized device.

33. The method of claim 31, further comprising reconstructing a new image of the scene based on the plurality of samples acquired.

34. The method of claim 31, further comprises applying a low-pass filter on the plurality of samples to band-limit the plurality of samples.

35. The method of claim 31, wherein $$K_{\Omega_v} = \min\left(B_v, \frac{1}{\delta_v}\right),$$

where $B_v$ specifies the signal cut-off frequency, and $\delta_v$ specifies the output resolution.

36. A machine-readable medium having instructions stored thereon for execution by a processor to perform a method comprising:
reconstructing a new image of a scene using image-based rendering based on a plurality of samples acquired under uncertain depth utilizing a minimum sampling rate determined by $$\Delta t_{\max} = \min_{z_e} \frac{(z_e + \Delta\eta)(z_e - \Delta\eta)}{4fK_{\Omega_v}\Delta\eta},$$

where $\Delta t_{max}$ specifies a maximum sampling interval along a t direction, $K_{\Omega_v}$ accounts for a signal cut-off frequency, a sampling camera resolution and an output resolution, $f$ specifies a sampling camera focal length, $z_e$ specifies an estimated depth, and $\Delta\eta$ specifies a depth error; and,
processing the new image.

37. The medium of claim 36, wherein processing the new image comprises at least one of: displaying the new image; and, storing the new image on a medium.

38. The medium of claim 36, wherein $$K_{\Omega_v} = \min\left(B_v, \frac{1}{\delta_v}\right),$$

where $B_v$ specifies the signal cut-off frequency, and $\delta_v$ specifies the output resolution.

39. A computer comprising:
a storage medium designed to store data representing a plurality of samples for image-based rendering acquired under uncertain depth utilizing a minimum sampling rate determined by $$\Delta t_{\max} = \min_{z_e} \frac{(z_e + \Delta\eta)(z_e - \Delta\eta)}{4fK_{\Omega_v}\Delta\eta},$$

where $\Delta t_{max}$ specifies a maximum sampling interval along a t direction, $K_{\Omega_v}$ accounts for a signal cut-off frequency, a sampling camera resolution and an output resolution, $f$ specifies a sampling camera focal length, $z_e$ specifies an estimated depth, and $\Delta\eta$ specifies a depth error; and,
a computer program designed to render a new image based on the plurality of samples stored as data on the storage medium.

40. The computer of claim 39, wherein the computer program is further designed to at least one of: display the new image, and store the new image on the storage medium.

41. The computer of claim 39, wherein $$K_{\Omega_v} = \min\left(B_v, \frac{1}{\delta_v}\right),$$

where $B_v$ specifies the signal cut-off frequency, and $\delta_v$ specifies the output resolution.

42. A computer-implemented method comprising:
determining a minimum sampling rate for acquisition of a plurality of samples of a scene for light-field rendering utilizing a minimum sampling rate determined as an optimal point on a minimum sampling curve, and,
acquiring the plurality of samples of the scene for light-field rendering in accordance with the minimum sampling rate as determined.

43. A machine-readable medium having instructions stored thereon for execution by a processor to perform a method comprising:
reconstructing a new image of a scene using light-field rendering based on a plurality of samples acquired utilizing a minimum sampling rate determined as an optimal point on a minimum sampling curve; and,
processing the new image.

44. A computer-implemented method comprising:
determining a minimum sampling rate and a number of depth layers for acquisition of a plurality of samples of a scene for image-based rendering constrained by a selected sampling point on a minimum sampling curve;
acquiring the plurality of samples of the scene for light-field rendering in accordance with the minimum sampling rate and the number of depth layers as determined.

45. A machine-readable medium having instructions stored thereon for execution by a processor to perform a method comprising:
reconstructing a new image of a scene using image-based rendering based on a plurality of samples acquired utilizing a minimum sampling rate and a number of depth layers constrained by a selected sampling point on a minimum sampling curve; and,
processing the new image.

* * * * *

UNITED STATES PATENT AND TRADEMARK OFFICE
CERTIFICATE OF CORRECTION

PATENT NO. : 6,738,533 B1
DATED : May 18, 2004
INVENTOR(S) : Shum et al.

It is certified that error appears in the above-identified patent and that said Letters Patent is hereby corrected as shown below:

Column 8,
Line 30, the equation should appear as follows:

$$L(\Omega_u, \Omega_v, \Omega_s, \Omega_t) = \int_{-\infty}^{\infty} \int_{-\infty}^{\infty} l(u,v,0,0) e^{-j(\Omega_u u + \Omega_v v)} du\, dv \int_{-\infty}^{\infty} e^{-j\left(\frac{f}{z_0}\Omega_u + \Omega_s\right)s} ds \int_{-\infty}^{\infty} e^{-j\left(\frac{f}{z_0}\Omega_v + \Omega_t\right)t} dt$$

$$= L'(\Omega_u, \Omega_v) \delta\left(\frac{f}{z_o}\Omega_u + \Omega_s\right) \delta\left(\frac{f}{z_0}\Omega_v + \Omega_t\right)$$

Line 42, "$Q_s$" should be changed to -- $\Omega_s$ --
Line 42, "$Q_t$" should be changed to -- $\Omega_t$ --
Line 60, "$(\Omega_v)$" should be changed to -- $\Delta_v$ --

Column 9,

Line 49, "$L_i(-\Omega_t z_i | f)$" should be changed to -- $L_i(-\Omega_t z_i / f)$ --

Line 50, "$|\Omega_t f$" should be changed to -- $|\Omega_t|$ --

Column 11,
Line 15, "$\Delta_v$" should be changed to -- $\Delta_v$ --
Line 25, "$(f(z_m^{-1} - z_{max}^{-1}))$" should be changed to -- $(f(z_{min}^{-1} - z_{max}^{-1}))$ --

UNITED STATES PATENT AND TRADEMARK OFFICE
CERTIFICATE OF CORRECTION

PATENT NO. : 6,738,533 B1
DATED : May 18, 2004
INVENTOR(S) : Shum et al.

It is certified that error appears in the above-identified patent and that said Letters Patent is hereby corrected as shown below:

Column 20,
Line 17, "$K\Omega_v$" should be changed to -- $K_{\Omega v}$ --

Signed and Sealed this

Twenty-fourth Day of August, 2004

JON W. DUDAS
*Director of the United States Patent and Trademark Office*